UNITED STATES PATENT OFFICE.

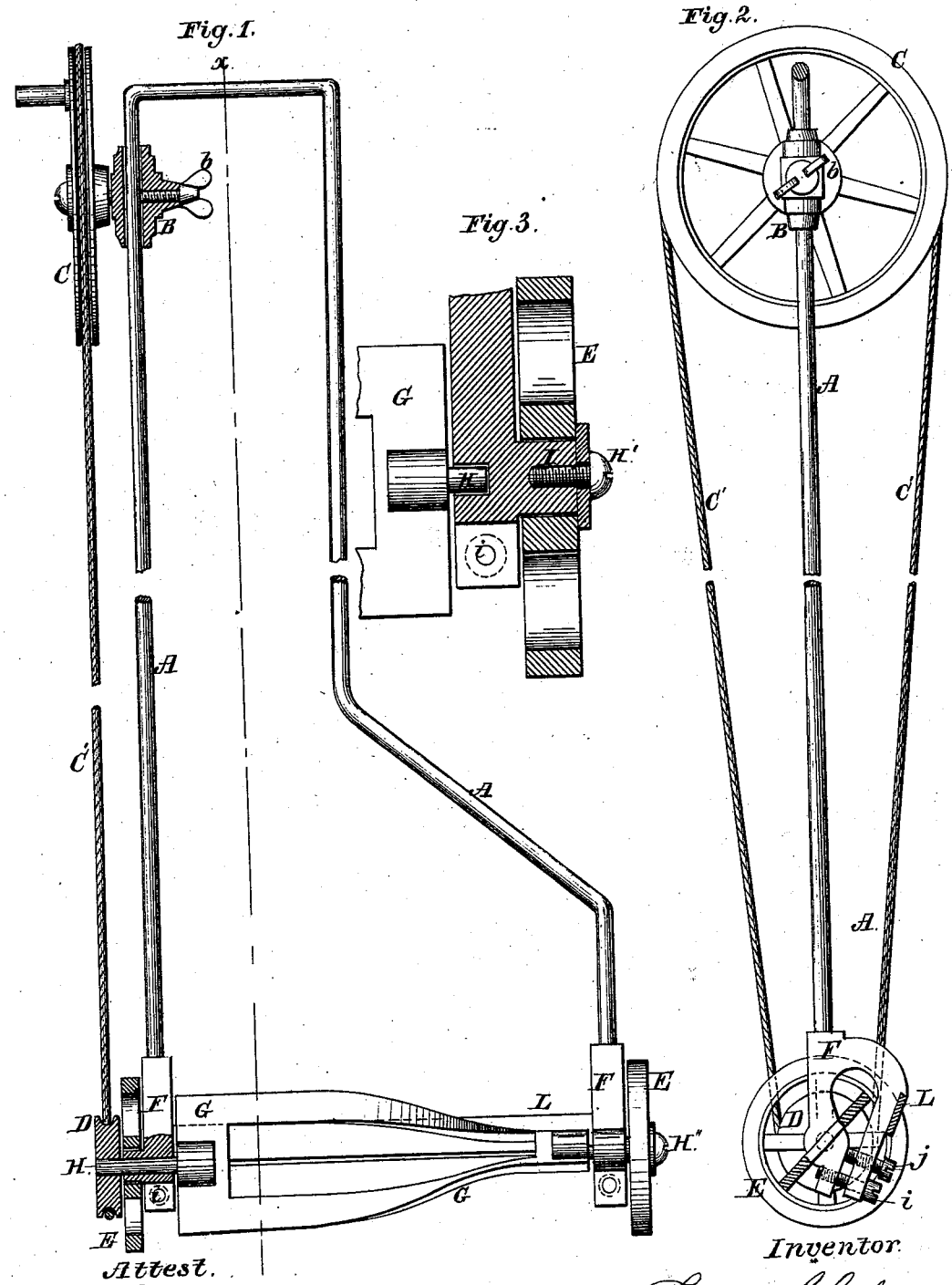

FRANK G. JOHNSON, OF NEW YORK, N. Y.

IMPROVEMENT IN LAWN-MOWERS.

Specification forming part of Letters Patent No. 204,153, dated May 28, 1878; application filed August 9, 1877.

*To all whom it may concern:*

Be it known that I, FRANK G. JOHNSON, of the city, county, and State of New York, have invented new and useful Improvements in Lawn-Mowers; and I do hereby declare that the following is a full, clear, and exact description of the construction and operation of the same.

Lawn-mowers are among recent contrivances for economy in useful or ornamental agriculture. Originally imported from England, where they were first made about forty years ago, the various modifications invented and patented here have usually followed the English patterns or general plan, in which the cutting-blades are actuated by a traction cylinder or roller through the agency of intermediate gearing-wheels, so that the motion or rapidity of action of the cutters is determined solely by the speed with which the apparatus is forced over the ground, and always an arbitrary proportion, whatever the speed may be. The cuts are usually about six to a foot, or two inches apart, at whatever speed over the grass, in addition to which the machines are complicated and heavy, which necessarily makes them expensive. They are easily deranged, and their use is thereby limited for so valuable an invention.

The object of my improvement is to obviate all the before-mentioned peculiarities except simply the rotating blades.

My mower is made with a special view to simplicity of construction, strength, and efficiency, by doing more and better work for the force exerted than can be done by the ordinary form of lawn-mower in use, and, moreover, to produce such a machine at a cost fifty per cent. less than those now commonly offered for sale.

My improvements consists in a great reduction of the number of parts or pieces to make up the apparatus; in the general simplicity of construction; in the increased relative strength of the working parts and their direct action; in the greatly-reduced weight; and particularly in making the rotation of the cutting-blades independent of and distinct from the movement of the machine over the ground.

In cutting lawn-grass that has grown too long or become dry, the cuts should have a sharp clip and close together, at the will of the operator, as is readily done by my mower by forcing the apparatus slowly over the ground and revolving the cutters, so as to clip the grass several times to the inch, if necessary. With my machine I can therefore cut long, dry, or wet grass equally well, can turn sharp corners, and work close along and around borders, shrubbery, trees, &c.

In the drawings, Figure 1 is a longitudinal horizontal plan of the machine. Fig. 2 is a vertical section through $x\ x$, Fig. 1; and Fig. 3 is an enlarged vertical cross-section of the right-hand end of Fig. 1, as L and H''.

The letters refer to like parts throughout.

A A show the handle or guiding-shafts, made from an iron rod or (preferred) gas-pipe, bent in the shape as shown, the left-hand leg being straight and of proper length; then it is bent at right angles or curved and prolonged a few inches to form the handle proper; then it is bent again and prolonged parallel to and about three-fourths the length of the other leg, where it is bent outward to a distance equal to that of the length of the cutter-shaft bearings, when it is bent again and prolonged to a length even with the end of the first leg. The two ends or extremities of this bent handle are cut with screw-threads, each to take into a socket formed upon each of two peculiarly-shaped vertical carrying-plates, F F, (shown in Figs. 1 and 2,) the functions of which will be hereinafter described. With the plates F F firmly screwed to the ends of A A, and the flat cutter-plate of steel L secured at either end to the bottom edges of F F, the framework of my mower is complete.

A cross-rod, as a stiffening brace or tie, may be secured to the plates F F, if necessary; but I have not found it needed.

The plates F F have a portion of their interior cut away through, giving them a goose-neck shape, (shown at Fig. 2,) with the upper part carrying a projecting boss, as shown at I, Fig. 3, for the two bearing or carrying wheels E E. (Shown in all the figures.)

G G show the rotative spiral cutters, held to a common bar or shaft by cross-plates at either end. H H are steel journals cast into the ends of the cutter-shaft, that at the right hand taking partially through the plate F, as shown in Fig. 3, in which it rotates, and the left-hand journal being longer, so as to also serve as the bearing for a grooved pulley, D, to which it is firmly secured outside of the wheel E, and which it holds in position, the opposite wheel E being held upon its bars by a friction-plate and screw, H".

B is a sliding collar, with a set screw, $b$, upon the straight leg of A, having on its outer side a lug or boss for a grooved hand-wheel, C, which carries a band, belt, or chain, C', that also takes around the driving-wheel D. In sliding the collar B to and fro, the band C' is tightened or loosened at will.

The diameter of the wheels E determines the height of cut on the grass, and upon these wheels the mower is caused to travel fast or slow, as desired. By turning the hand-wheel C, the pulley D is rotated, carrying the cutters G at any required velocity. Turning the set-screws $i$ and $j$ adjusts and regulates the edges of the rotating cutters to and from the stationary cutter-plate L, as necessary.

I do not claim, generally, the independent hand-wheel for driving the cutters of lawn-mowers; but

What I claim, and desire to secure by Letters Patent, is—

1. The curved plates F, constituting the carriers of all the working parts, as the axles of the cutters G, bearing-wheels E, pressure-knife L, and the adjusting-screws $i$ and $j$, substantially as described.

2. The operating-wheel C and the adjustable sliding sleeve B, arranged in the manner and for the purpose set forth.

3. The revolving cutters G and carrying-shaft, with its long and short bearings, as combined with the bearing-plate F, supporting-wheels E, and driving-wheel D, substantially as described.

4. The combination, with the cutters of a lawn-mower, of an independent adjustable hand-wheel, an endless band, or chain, and a pulley secured to the cutter-shaft, substantially as described.

5. The combination of the revolving cutters G, stationary pressure-knife L, curved plates F, carrying-wheels E, drive-wheel C, and the guiding-frame handle A, arranged substantially in the manner and for the purposes described.

FRANK G. JOHNSON.

Witnesses:
J. B. HYDE,
B. H. GALPEN.